United States Patent [19]

Ohwaki et al.

[11] 4,045,621
[45] Aug. 30, 1977

[54] RECORDING SYSTEM FOR A MULTICHANNEL RECORD DISC

[75] Inventors: Isao Ohwaki, Tokyo; Kohei Sasamura; Teruo Muraoka, both of Sagamihara; Takaro Mori, Yokohama, all of Japan

[73] Assignee: Victor Company of Japan, Ltd., Yokohama, Japan

[21] Appl. No.: 610,263

[22] Filed: Sept. 4, 1975

Related U.S. Application Data

[63] Continuation of Ser. No. 421,268, Dec. 3, 1973, abandoned.

[30] Foreign Application Priority Data

Dec. 7, 1972 Japan ............................. 47-122046
Dec. 14, 1972 Japan ............................. 47-124799

[51] Int. Cl.² .......................... G11B 3/00; G11B 3/74
[52] U.S. Cl. ................ 179/100.4 ST; 179/100.1 TD; 179/1 GQ; 179/100.4 C
[58] Field of Search ............ 179/100.1 TD, 100.4 C, 179/100.4 ST, 100.4 R, 15 BT, 1 GQ

[56] References Cited

U.S. PATENT DOCUMENTS

| 3,229,048 | 1/1966 | Fox | 179/100.4 ST |
| 3,403,233 | 9/1968 | Cooper | 179/100.4 C |
| 3,772,467 | 11/1973 | Ohwaki | 179/100.4 ST |
| 3,803,367 | 4/1974 | Takahashi | 179/100.4 ST |
| 3,839,602 | 10/1974 | Takahashi | 179/100.4 ST |

OTHER PUBLICATIONS

"Tracing Distortion — Its Cause and Correction in Stereodisk Recording Systems" by Fox and Woodward; Journal of the Audio Engineering Society; Oct. 1963, vol. 11, No. 4; pp. 294–301.

Primary Examiner—Robert S. Tupper
Assistant Examiner—Alan Faber

[57] ABSTRACT

A multichannel record disc recording system uses two channels of direct wave sum signals and two channels of angle-modulated wave difference signals which are multiplexed and recorded in one sound groove on a record disc. During recording, a tracing distortion compensation means imparts a reverse distortion which cancels the tracing distortion produced, with respect to the sum signals, during reproducing. Since the compensation means is in the transmission paths of the direct wave sum signals, the reverse distortion is only imparted to the direct wave sum signals. Also, phase correction signals are provided.

1 Claim, 8 Drawing Figures

27
RECORDING SYSTEM FOR A MULTICHANNEL RECORD DISC

This is a continuation of application Ser. No. 421,268, filed Dec. 3, 1973, now abandoned.

BACKGROUND OF THE INVENTION

This invention relates to a recording system for a multichannel record disc and more particularly to a system for recording a discrete multichannel record disc with a compensation for tracing distortion which is recorded to prevent occurrence of tracing distortion of the reproducing stylus.

The applicant had previously proposed a recording and/or reproducing system for four channel record discs as disclosed in U.S. Pat. No. 3,686,471 issued Aug. 22, 1972, and entitled "System for Recording and/or Reproducing Four Channel Signals on a Record Disc." This system is already being used on a worldwide basis.

By this system, two channels of sum and difference signals are formed respectively from the four channels. More specifically, the four signals of the first through fourth channels are respectively denoted by the notations CH1, CH2, CH3, and CH4. Sum signals (CH1 + CH2) and (CH3 + CH4) and difference signals (CH1 − CH2) and (CH3 − CH4) are formed from these four signals.

Thereafter, the difference signals are angle modulated, to obtain angle modulated wave difference signals F(CH1 − CH2) and F(CH3 − CH4) of a band higher than the above mentioned direct wave sum signals. These signals are mixed with the direct wave sum signals (CH1 + CH2) and (CH3 + CH4). Two sets of multiplexed signals {(CH1 + CH2) + F(CH1 − CH2)} and {(CH3 + CH4) + F(CH3 − CH4)} of these direct wave sum signals and angle modulated wave difference signals are recorded by respectively cutting them on the left and right walls of a single groove on a record disc of the 45-45 type.

The direct wave sum signals have a frequency band from 0 to 15 KHz, while the angle modulated wave difference signals have a frequency band from 20 to 45 KHz.

In general, as is known, when a reproducing stylus traces the sound groove of a record disc during reproduction, a tracing distortion inevitably occurs. This distortion occurs since the tip of the reproducing stylus is not an ideal point but has, of course, a finite radius of curvature. The locus of the center of the stylus does not coincide with the shape of the sound groove. Harmonics are produced as a natural result of the occurrence of this tracing distortion, such as the second, third, harmonics etc.

When a tracing distortion is produced during reproduction, harmonic components of the direct wave signal tracing distortion enter into the band of the angle modulated wave signal. Furthermore, distortion components are produced due to mutual interference between the direct wave signal and the carrier wave signal. The harmonics of the angle modulated wave signal can be removed by a band-pass filter which passes only the angle modulated wave signal. The harmonic components of the direct wave signal enter the angle modulated wave signal and cannot be removed by the filter. When the tracing distortion harmonic become admixed in the angle modulated wave signal band in this manner, the distribution of the side-band energy of the angle modulated wave signal changes. Responsive thereto, the tone quality of the reproduced demodulated signal deteriorates.

Accordingly, the applicant had previously proposed a system for applying a reverse distortion deriving the recording four channel signals on a record of disc. Therefore, the tracing distortion which occurs at the time of reproducing, the distortions originally recorded cancel each other. A reproduced signal is obtained which is exactly the same as the intended recording signal. In this previously proposed system, a tracing distortion compensation (tracing distortion neutralization) is provided at a stage after a mixer for mixing and multiplexing the above mentioned direct wave sum signals and the angle modulated wave signal. The tracing distortion compensation circuit applies an artificial compensation for tracing distortion to each of the direct wave sum signals to the angle modulated wave signal.

The above mentioned distortion compensation circuit unavoidably imparts a delay to the signal because it employs delay circuits. By this proposed system, however, the distortion compensation must be carried out over the entire band of the direct wave signal band and the angle modulated wave signal band. For this reason, the distortion compensation circuit must compensate over the entire frequency band. At the same time, the delay time must be constant over the entire frequency band.

However, it is difficult to realize a distortion compensation circuit having a uniform delay time over the entire band of from 0 to 45 KHz. For example, one problem heretofore encountered has been that the delay time for the angle modulated wave band becomes different from the delay time for the direct wave band. Thus, a deleterious effect is imparted to the angle modulated wave band, and thorough distortion compensation cannot be carried out.

Furthermore, a signal which has undergone tracing distortion compensation assumes a waveform having sharp projections at the crests (or valleys) even when the original signal is of, for example, a sinusoidal waveform. Accordingly, even when tracing distortion compensation is carried out electrically on an angle modulated wave signal of high frequency of from 20 to 45 KHz as described above, there is the problem of the cutting mechanism. The cutting is not capable, itself, of faithfully and completely tracing a signal of a waveform as described above. Thus, when tracing distortion compensation is carried out for angle modulated wave signals, there is almost no effect.

In accordance with the present invention, the above mentioned tracing distortion compensation is carried out with respect to only the direct wave signal. As a result, the distortion compensation characteristic and the delay characteristic need be matched only to a band of 0 to 15 KHz. For this reason, the organization of the distortion compensation circuit is facilitated.

On the other hand, if a sound groove of a waveform, wherein a direct wave signal and an angle modulated wave signal are superimposed as described above, is reproduced by a reproducing stylus having a certain tip radius, the direct wave signal imparts a phase modulation to the angle modulation signal as described hereinafter.

In accordance with the present invention, for the purpose of mutual cancellation at the time of reproducing of the above mentioned phase modulation, recording is carried out with the addition beforehand of a signal for this mutual cancellation.

SUMMARY OF THE INVENTION

It is a general object of the present invention to provide a novel and useful multichannel record disc recording system wherein the above described problems of the prior art are solved.

A specific object of the invention is to provide a system wherein tracing distortion compensation is carried out only with respect to the direct wave signal before it is mixed and superimposed with the angle modulated wave signal, and recording is thus carried out on a multichannel record disc.

Another object of the invention is to provide a system wherein recording on a multichannel record disc is carried out by providing tracing distortion compensation for only the direct wave signal. Here an object is to mix the compensation signal beforehand with the recording signal to cancel the phase modulation component which the angle modulated wave receives the direct wave signal at the time of reproducing.

Further objects and features of the present will be apparent from the following detailed description when read in conjunction with the accompanying drawings.

Figure 5:
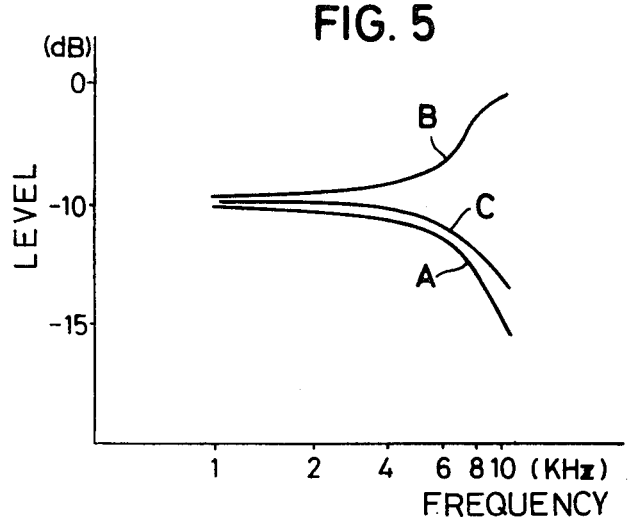
Figure 6:
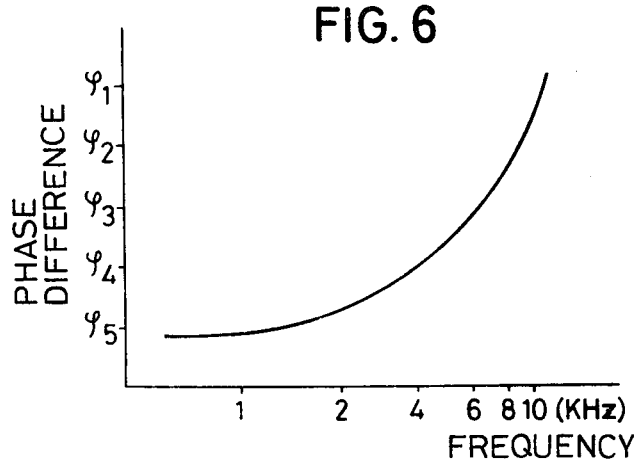
Figure 8:
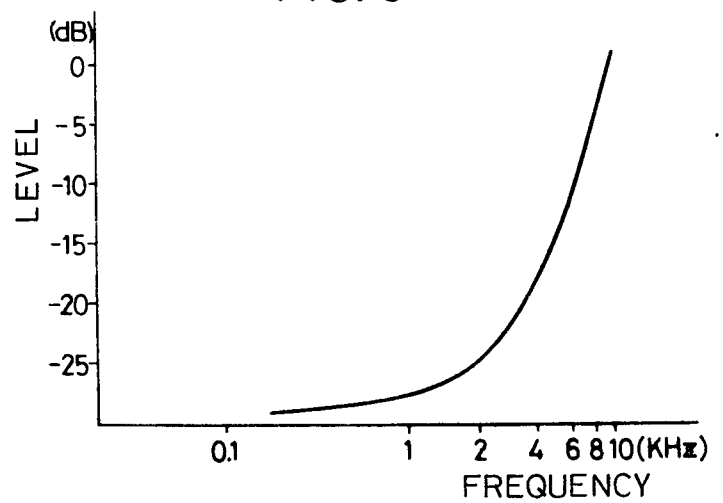
Figure 7:
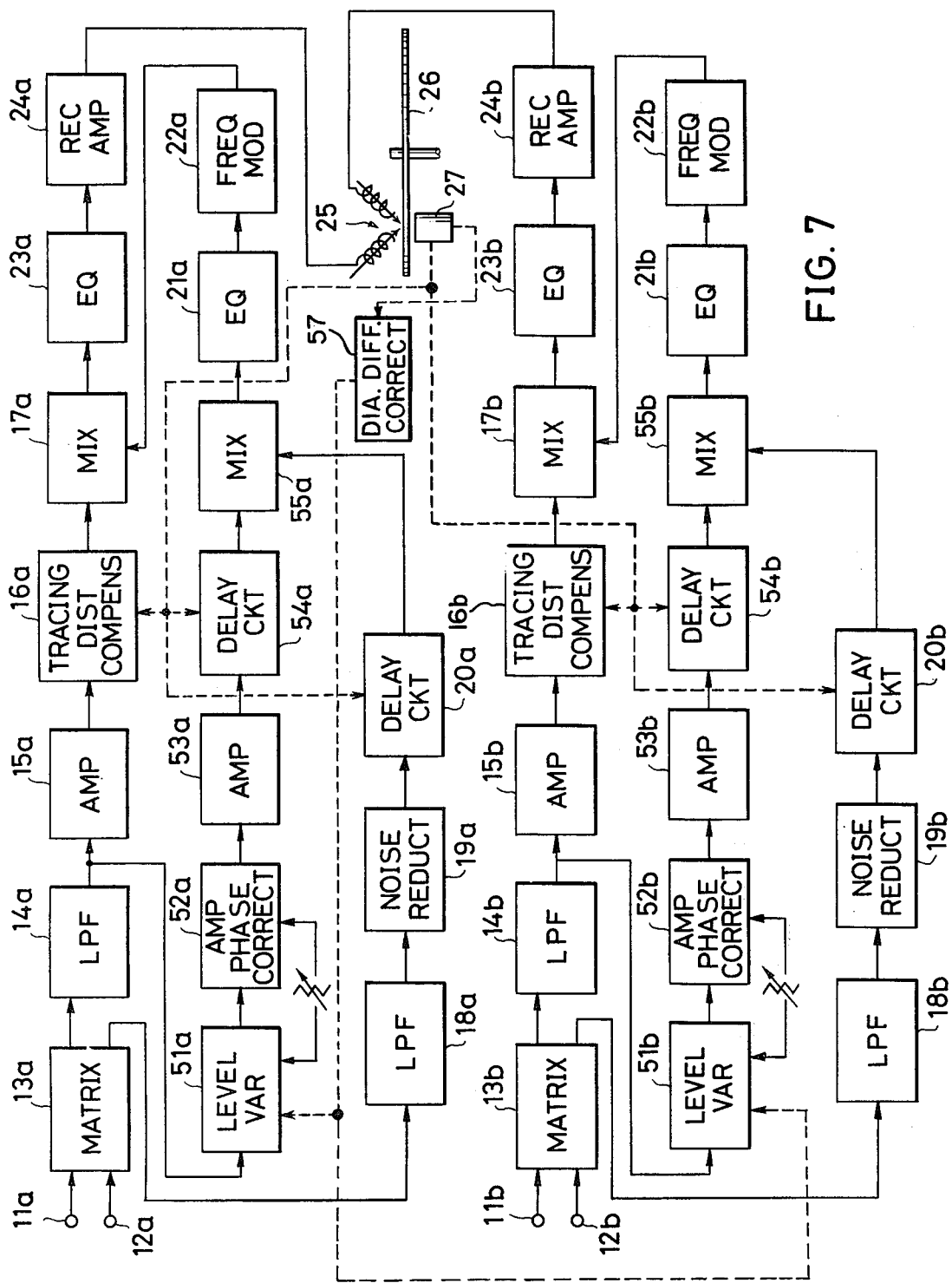

FIG. is a diagram for describing how the angle modulated wave signal component is phase modulated by the direct wave signal during reproduction;

FIG. 5 is a graph indicating demodulation output levels of angle modulated wave signals;

FIG. 6 is a graph indicating the variation with frequency of the phase difference of a difference signal relative to a sum signal;

FIG. 7 is a block diagram of another embodiment of a recording system according to the invention; and FIG. 8 is a graph showing the correction characteristic curve of an amplitude - phase correction circuit in the system illustrated in FIG. 7.

Figure 1:
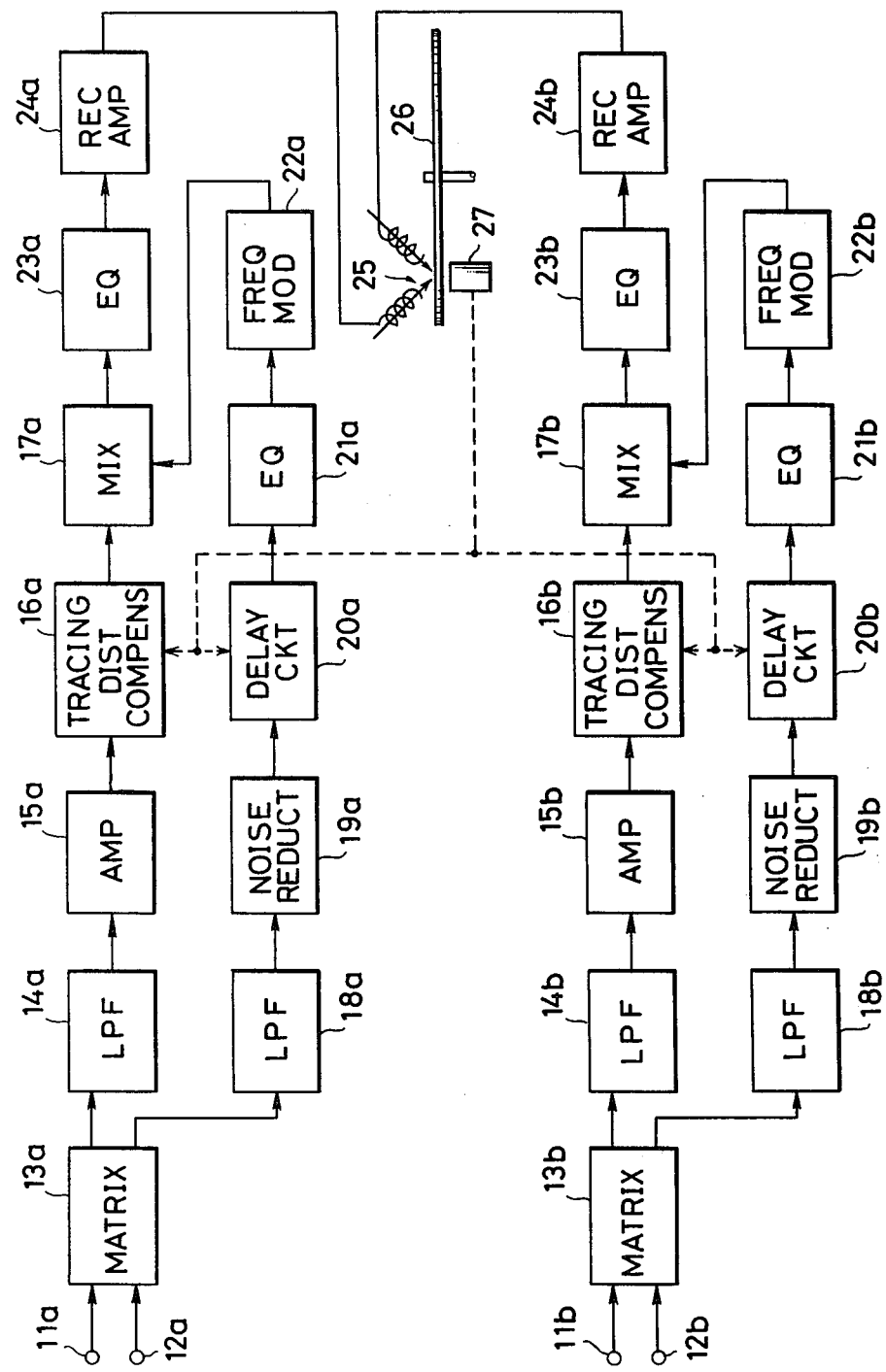
FIG. 1 is block diagram of one embodiment of a four channel record disc recording system according to the present invention.

FIGS. 1 and 7 each show two identical channels for processing four channels. The components in the channel for processing signals CH1 and CH2 have a suffix a, and those for processing signals CH3 and CH4 have a suffix b. Since these two channels are identical, the following description will refer to only the component's reference numeral, without the suffiix, it being understood that such reference numeral may be considered as referring to either the a or the b channel.

DETAILED DESCRIPTION

In the first embodiment of a four channel record disc recording system, according to the present invention as shown in FIG. 1, first and second channel signals CH1 and CH2 are supplied through input terminals 11, and 12 to a matrix circuit 13. A resulting output sum signal (CH1 + CH2) is passed from this matrix circuit 13 through a low-pass filter 14. After being amplified by an amplifier 15, the sum signal is supplied to a tracing distortion compensation circuit 16.

Figure 2:
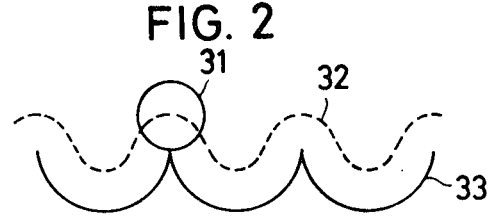
FIG. 2 is a diagram for providing an explanation of tracing distortion and of the principle of tracing distortion compensation.

In general, a reproducing stylus having a tip of a diameter 31 (FIG. 2) travels so that its center traces a sinusoidal wave as indicated by the broken line 32. The waveform circumscribing the circle 31 assumes a waveform as indicated by the full line 33. Therefore, in order to cause, conversely, the center of the reproducing stylus to travel along the sinusoidal wave 32, in the case wher the signal to be recorded is a sinusoidal wave, recording must be carried out with a waveform as indicated by the full line 33. The tracing distortion compensation circuit 16 imparts beforehand a signal which compensates for tracing distortion. The compensation cancels the tracing distortion at the time of reproducing. Circuit 16 comprises stylus tip voltage generating means, a plurality of delay circuits, and a gate circuit for detecting maximum voltage. The principle of the operation of the tracing distortion compensation circuit 16 is described in, an article entitled, "Tracing Distortion — It's Cause And Correction In Stereo Disc Recording Systems" by E. C. Fox and J. G. Woodward, "Journal of the Audio Engineering Society" published October, 1963, Vol. 11, No. 4.

The tracing distortion compensation circuit 16 supplies to a mixer 17a direct wave sum signal which has been given a reverse distortion to cancel tracing distortion in the tracing distortion.

On one hand, an output difference signal (CH1 − CH2) of the matrix circuit 13 is pased through a low-pass filter 18. Then, after passing through a noise reduction circuit 19, it is supplied to a delay circuit 20. This delay circuit 20 imparts a delay to the difference signal corresponding to the delay caused passing the direct signal wave sum signal through the tracing distortion compensation circuit 16 to match the timing of the sum and difference signals. In actual practice, it is necessary to match the delay times in their entirety, including the recording and reproducing systems. The delay time of the delay circuit 20 is selected so that the time difference between the direct wave signal and the angle modulated wave signal in the recording system will be 40 microseconds.

The difference signal delayed by the delay circuit 20, after acquiring a specific frequency characteristic in a FM-PM correction equalizer 21, is supplied to a frequency modulator 22. A carrier wave of a frequency of 30 KHz is modulated so that it is frequency modulated (FM) by a difference signal of less than 800 Hz, phase modulated (PM) by a difference signal of from 800 Hz to 6 KHz, and frequency modulated (FM) by a difference signal of more than 6 KHz. It becomes an angle modulated wave of a band of from 20 to 45 KHz. The angle modulated difference signal thus produced as output is supplied to the mixture 17 where it is mixed and multiplexed with the output direct wave sum signal of the tracing distortion compensation circuit 16.

The multiplexed signal output of the mixer 17 is passed through an RIAA (Recording Industries Association of America) characteristic equalizer 23 and a recording amplifier 24. It is then supplied to one of the coils for driving the cutting stylus of a cutting machine 25. Thus, the output of mixer 17 drives the stylus, cuts, and records on one wall of one groove of a disc 26.

While, it is not shown in the drawings, another system which is the same as the system described above and illustrated by block diagram in FIG. 1 is provided also for the third and fourth channel signals. These signals are processed. in a similar manner to produce a multiplexed signal, which is supplied to the other cutting stylus driving coil of the cutting machine 25. These signals cut and record on the other wall of the sound groove of the disc 26.

Since the relative linear speed between the cutting stylus and the disc 26 varies with the position of the stylus on the disc in the radial direction, the position of the cutting stylus is detected by means of a stylus position detecting device 27. The detection output is used to control the tracing distortion compensation circuit 16. The delay circuit 20 thereby varies respectively the tracing distortion compensation waveform and the delay time.

If a tracing distortion compensation circuit is provided after the mixer 17, as in the conventional manner as mentioned hereinbefore, it is desirable and requisite that the delay time be maintained constant over the entire frequency band of the direct wave signal and the angle modulated wave signal. In actual practice, however, the delay time becomes irregular with increasing frequency. The delay time - frequency characteristic shows a fluctuation, as indicated by the curve III in FIG. 3.

Figure 3:
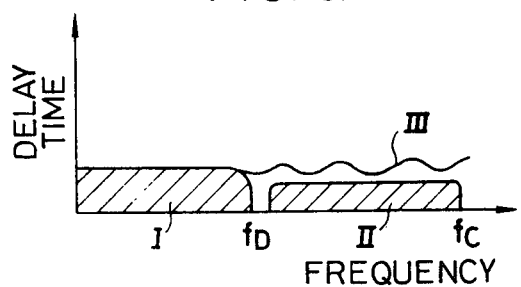
FIG. 3 is a graph indicating delay time - frequency characteristic of a tracing distortion compensation circuit.

In contrast, in the system of the present invention, the direct wave signal is given a uniform delay time over the entire band of the direct wave signal by the tracing distortion circuit 16 as indicated by the part I in FIG. 3. Furthermore, the delay circuit 20 gives the angle modulated wave signal is given a uniform delay time over the entire band of the angle modulated wave signal, as indicated by part II in FIG. 3. The tracing distortion compensation circuit 16 is so adapted that the delay time becomes constant only with respect to the band of the direct wave signal. The delay circuit 20 is so adapted that the delay time becomes constant only with respect to the band of the angle modulated wave signal. Accordingly, the organizations of these circuits are facilitated.

Figure 4:
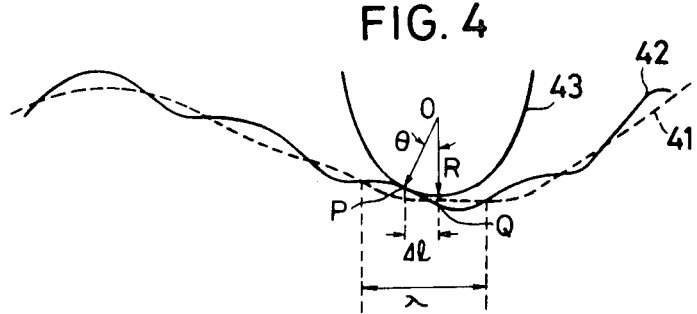

Next, the relationship between the multiplexed signal waveform of the above mentioned direct wave signal and the angle modulated wave signal and the reproducing stylus tip will be considered in conjunction with FIG. 4.

In FIG. 4, the broken line 41 indicates the waveform of only the direct wave signal. The full line 42 indicated the waveform of the angle modulated wave signal superimposed on the direct wave signal. If a reproducing stylus 43 having a tip of a radius R abuts against a groove this waveform 42, the point Q immediately below the center O of the stylus tip of the reproducing stylus 43 must be reproduced. The actual practice, the stylus point contacts the waveform 42 at a point P and reproduces this point. Accordingly, when the angle between the points Q and P is denoted by $\theta$, an error of $\Delta L$ ( = $R\sin\theta$), which is the difference between Q and P is produced. This error imparts a phase error of $$\phi = \frac{2\pi}{\lambda} \Delta l$$

to the angle modulated wave, where $\lambda$ is the recording wavelength of the angle modulated wave. The error $\Delta l$ becomes a function of the direct wave signal and, in accordance with the waveform of the direct wave signal, varies from moment to moment.

Accordingly, the phase error $\phi$ also becomes a function of the direct wave signal. The angle modulated wave signal is subjected to phase modulation by the direct wave signal. Therefore, when this is demodulated, the output thus obtained is one wherein the original difference signal and the direct wave signal are in a state of mutual interference. This output is representable as an approximation as the sum of the fundamental difference signal and a signal wherein the amplitude and phase of the original direct wave are disordered (tentatively called "distorted direct wave signal"). When this distorted direct wave signal is present, the separation characteristic of the demodulated signal becomes poor. The tone quality of the reproduced sounds deteriorates because of distortions, such as harmonic distortion and cross modulation distortion. Furthermore, components of higher order distortion of the distorted direct wave signal components may even become mixed within the band of the angle modulated wave to produce unnecessary noise.

If the angle modulated difference signal is reproduced direction as it is, the frequency characteristic of the output level is as indicated by curve A in FIG. 5. On one hand, when the angle modulated difference signal of the multiplexed signal recorded with the system indicated in FIG. 1 is demodulated, the angle modulated difference signal is subjected to modulation by the direct wave signal at the time of reproducing as mentioned above. The degree of modulation becomes high, whereby the output level of the resulting demodulated difference signal exhibits a characteristic of becoming high, with increasing frequency as indicated by curve B.

The phase difference $\phi$ received by the difference signal at this time increases with increasing frequency above 1 KHz as indicated in FIG. 6. Accordingly, as a result of this phenomenon and the characteristic of the curve B shown in FIG. 5, the channel separation of the demodulated signal deteriorates.

The above described tracing distortion compensation circuit reduces the above described deterioration to some extent. However, it cannot remove it thoroughly.

Then, in the next embodiment, the above mentioned tracing distortion compensation is carried out for the direct wave signal. At the same time, a compensation of amplitude and phase is carried out so as to cancel the error corresponding to the above mentioned $\Delta l$ with respect to the angle modulated wave signal.

A second embodiment of the system according to the invention is shown by block diagram in FIG. 7. The parts which are the same as those in FIG. 1 are designated by like reference numerals. A detailed description of these parts is omitted hereinafter.

The direct wave sum signal (CH1 + CH2) produced as output of the low-pass filter 14 is supplied by way of the amplifier 15 to the tracing distortion compensation circuit 16 as described before. At the same time, the sum signal is also supported to a level variable circuit 51. This level variable circuit 51 is provided for the following purpose. The recording wavelength $\lambda$ of the carrier wave varies with the diametric difference of the sound groove. That is a difference in a position in the diametric direction on the recording disc. In accordance with this variation, there is a fluctuation of the phase difference $\phi$ represented by the above mentioned quantity $$\frac{2\pi}{\lambda} \Delta l.$$

The level variable circuit 51 functions to correct for this fluctuation and, under control of a diametric difference correction control circuit 57 in accordance with the output of the cutting stylus position detecting device 27, variably controls the level of the sum signal component according to the diametric difference.

This level variable circuit 51 produces as output a sum signal, which is supplied to an amplitude-phase correction circuit 52. This amplitude-phase correction circuit 52 provides optimum compensation for amplitude and phase distortion in order to cancel errors of amplitude and phase dependent on frequency as indicated in FIGS. 5 and 6. The amplitude characteristic correction curve of this correction circuit 52 as shown in FIG. 8 indicates increasing level with increasing frequency.

The sum signal which has been amplitude-phase corrected by this circuit 52 is supplied through an amplifier 53 and a delay circuit 54 to a mixer 55. On one hand, the difference signal which has passed through the low-pass filter 18, the noise reduction circuit 19, and the delay circuit 20 is also supplied to the mixer 55, where it is mixed with the above described sum signal which has been level corrected and amplitude-phase corrected.

The resulting output signal of the mixer 55 is passed through the FM-PM correction equalizer 21 and angle modulated by the frequency modulator 22. The resulting angle modulated signal is mixed in the mixer 17 with the direct wave sum signal from the tracing distortion compensation circuit 16. The resulting signal is cut and recorded on the disc 26 by a cutting stylus, in the same manner as in the above described first embodiment.

A signal is generated which corresponds to the quantity producing phase modulation at the time of reproducing in the angle modulated wave, as a result of the direct wave sum signal, as described above. This signal will cancel the modulation component and is added to and contained in the difference signal. For this reason, when this signal is reproduced, the modulation component of the angle modulated wave due to the direct wave is cancelled and nullified.

As a result, there is no mixing of a distorted direct wave signal into the difference signal. In an actual instance, the results were such that the demodulated output level of the difference signal was as indicated by curve C in FIG. 5, which is substantially close to the curve A.

In the system of the present invention, the effect particularly of a direct wave signal of a frequency higher than 1 KHz on an angle modulated wave signal is reduced. Moreover the separation of the different channels can be improved. This effect is particularly notable in the frequency band from 2 to 10 KHz.

Further, this invention is not limited to these embodiments but variations and modifications may be made without departing from the scope and spirit of the invention.

What is claimed is:

1. A multichannel record disc recording system comprising:

matrix means for forming a first sum signal and a first difference signal responsive to first and second channel signals, and for forming a second sum signal and a second difference signal responsive to third and fourth channel signals;

a first transmission path for receiving the first sum signal, said first transmission path comprising first tracing distortion compensation means for imparting a complement of the distortion caused by the first sum signal, to thereby cancel the tracing distortion of the first sum signal, which distortion may be produced when a recorded signal is reproduced;

a second transmission path for receiving the first difference signal, said second transmission path comprising first delay means for delaying the first difference signal, and first modulator means for angle-modulating a carrier signal responsive to the output signal of said first delay means to produce a first angle-modulated difference signal;

said first delay means imparting a delay to the first difference signal which complements the delay imparted by said first tracing distortion compensation means to the first sum signal passing therethrough;

a third transmission path for receiving the second sum signal, said third transmission path comprising second tracing distortion compensation means for imparting a complement of the distortion caused by the second sum signal to thereby cancel the tracing distortion of the second sum signal, which distortion may be produced when a recorded signal is reproduced;

a fourth transmission path for receiving the second difference signal, said fourth transmission path comprising second delay means for delaying the second difference signal, and second modulator means for angle-modulating the carrier signal with the output signal of said second delay means to produce a second angle-modulated difference signal, said second delay means imparting a delay to the second difference signal which complements the delay imparted by said second tracing distortion compensation means to the second sum signal passing therethrough;

mixing means for multiplexing the output signal of said first transmission path and the first angle-modulated difference signal, thereby producing a first multiplex signal, and for multiplexing the output signal of said third transmission path and the second angle-modulated difference signal, thereby producing a second multiplex signal;

means comprising a cutting stylus for recording the first and second multiplex signals respectively on the left and right walls of a single groove on a disc;

a fifth transmission path for receiving a part of the first sum signal, said fifth transmission path comprising first correction means for correcting the received part of the first sum signal to cancel any phase modulation distortion which may be produced in the first angle-modulated difference signal responsive to the output signal of said first transmission path at the time when the recorded first multiplex signal is reproduced by means of a reproducing stylus;

a sixth transmission path for receiving a part of the second sum signal, said sixth transmission path comprising second correction means for correcting the received part of the second sum signal to cancel any phase modulation distortion which may be produced in the second angle-modulated difference signal responsive to the output signal of said third transmission path at the time when the recorded second multiplex signal is reproduced by means of the reproducing stylus;

second mixing means in said second transmission path and disposed between said first delay means and said first modulator means, said second mixing means mixing the output signal of said first delay means and the output signal of said first correction means, said first modulator means modulating the carrier signal responsive to the output of said second mixing means; and third mixing means in said fourth transmission path and disposed between said second delay means and said second modulator means, said third mixing means mixing the output signal of said second delay means and the output signal of said second correction means, said second modulator means modulating the carrier signal responsive to the output signal of said third mixing means.

* * * * *